United States Patent
Hjortland et al.

(10) Patent No.: US 11,739,962 B2
(45) Date of Patent: Aug. 29, 2023

(54) SYSTEMS AND METHODS FOR LEAK DETECTION AND MANAGEMENT IN HEATING, VENTILATING, AND AIR CONDITIONING (HVAC) SYSTEMS

(71) Applicant: Johnson Controls Tyco IP Holdings LLP, Milwaukee, WI (US)

(72) Inventors: Daniel R. Hjortland, Milwaukee, WI (US); Daniel R. Rumler, New Berlin, WI (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 14 days.

(21) Appl. No.: 17/371,879

(22) Filed: Jul. 9, 2021

(65) Prior Publication Data
US 2023/0009291 A1    Jan. 12, 2023

(51) Int. Cl.
| | |
|---|---|
| *F24F 11/36* | (2018.01) |
| *F24F 11/77* | (2018.01) |
| *F24F 11/63* | (2018.01) |
| *F24F 11/61* | (2018.01) |
| *F24F 11/88* | (2018.01) |
| *F24F 5/00* | (2006.01) |
| *F24F 11/00* | (2018.01) |

(52) U.S. Cl.
CPC ............. *F24F 11/36* (2018.01); *F24F 11/61* (2018.01); *F24F 11/63* (2018.01); *F24F 11/77* (2018.01); *F24F 11/88* (2018.01); *F24F 5/00* (2013.01); *F24F 11/00* (2013.01); *G05B 2219/2614* (2013.01)

(58) Field of Classification Search
CPC .. F24F 11/36; F24F 11/61; F24F 11/63; F24F 11/77; F24F 11/88; F24F 5/00; F24F 11/00; G05B 2219/2614
See application file for complete search history.

(56) References Cited

U.S. PATENT DOCUMENTS

| | | | |
|---|---|---|---|
| 7,891,573 B2 * | 2/2011 | Finkam | F24F 11/30 236/1 C |
| 10,488,065 B2 | 11/2019 | Chen et al. | |
| 10,488,072 B2 * | 11/2019 | Yajima | F24F 11/83 |
| 10,514,176 B2 | 12/2019 | Weinert | |
| 10,731,884 B2 * | 8/2020 | Blanton | F24F 11/77 |

(Continued)

FOREIGN PATENT DOCUMENTS

WO    2018187450 A1    10/2018

*Primary Examiner* — Ramesh B Patel
(74) *Attorney, Agent, or Firm* — Fletcher Yoder, P.C.

(57) ABSTRACT

A heating, ventilation, and air conditioning (HVAC) system includes multiple circuit components that enable determining that a refrigerant leak is present in the HVAC system based on a signal. The circuit components then send a first set of instructions to a first set of control systems associated with one or more fans in response to the refrigerant leak being present. The first set of instructions causes the one or more fans to activate. The system then determines that the refrigerant leak signal is no longer present, and initiates a counter to detect when a period of time has passed in response to determining that the refrigerant leak signal is no longer present. The system then sends a second set of instructions to the first control system to cause the fans to return to base operating conditions in response to the counter indicating the period of time has passed.

9 Claims, 10 Drawing Sheets

(56) References Cited

U.S. PATENT DOCUMENTS

| | | | | |
|---|---|---|---|---|
| 10,935,454 B2* | 3/2021 | Kester | .................... | F25B 49/005 |
| 11,041,647 B2* | 6/2021 | Weinert | ................. | F25B 49/025 |
| 11,365,897 B2* | 6/2022 | Blanton | ................... | F24F 11/77 |
| 11,512,867 B2 | 11/2022 | Atchison et al. | | |
| 2018/0045424 A1* | 2/2018 | Yajima | .................... | F24F 7/007 |
| 2019/0170603 A1* | 6/2019 | Gupte | ................... | F25B 49/005 |
| 2020/0132321 A1* | 4/2020 | Blanton | ................... | F24F 11/77 |
| 2020/0248919 A1 | 8/2020 | Green et al. | | |
| 2020/0263891 A1* | 8/2020 | Noor | ....................... | F24F 11/65 |
| 2021/0310678 A1* | 10/2021 | Weinert | ................... | F24F 11/36 |
| 2021/0396413 A1* | 12/2021 | Maddox | ................... | F24F 11/89 |
| 2022/0235961 A1* | 7/2022 | Tanaka | .................... | F24F 11/84 |
| 2022/0380648 A1* | 12/2022 | Kumakura | ............. | C09K 5/045 |

* cited by examiner

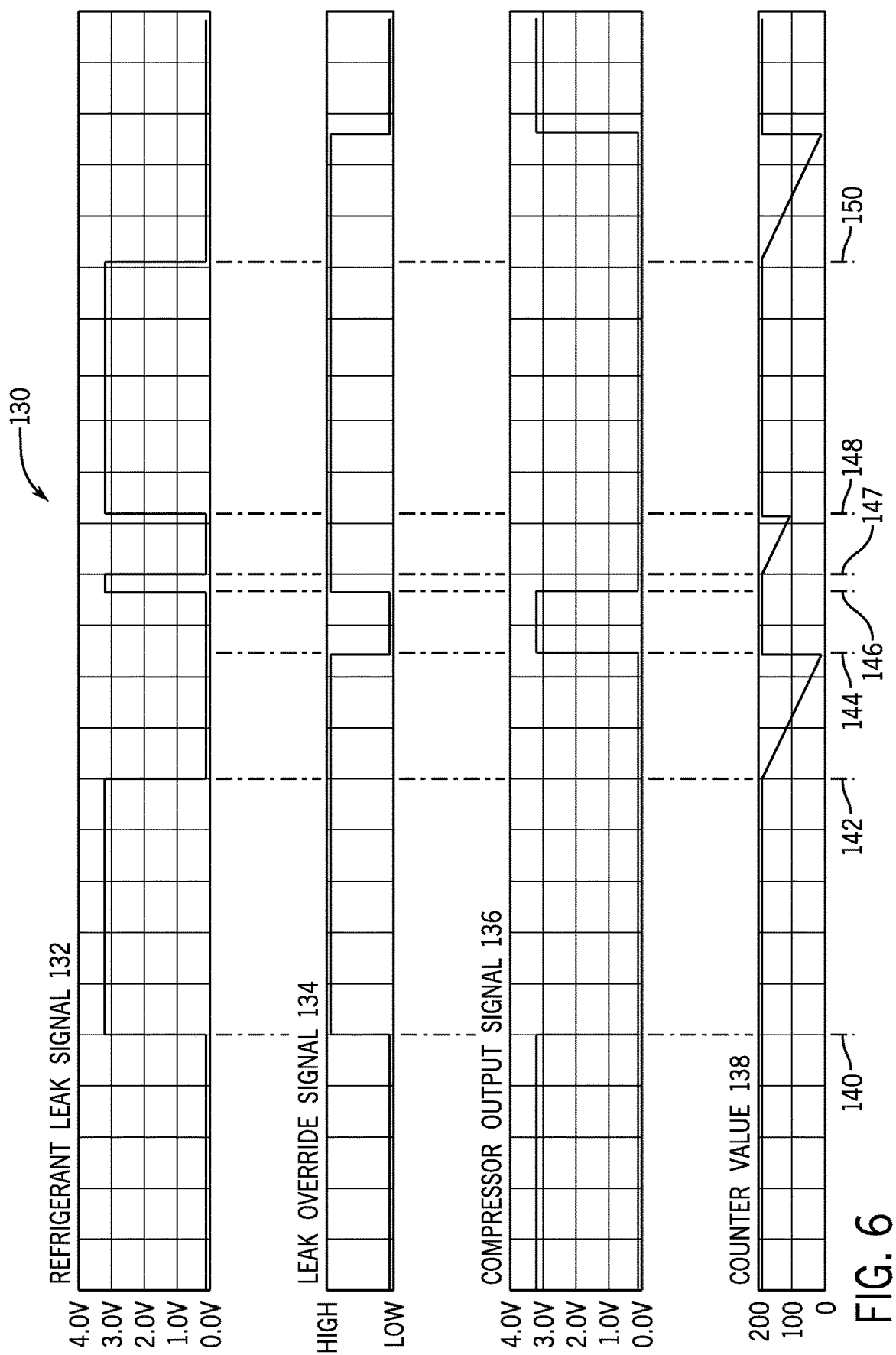

SYSTEMS AND METHODS FOR LEAK DETECTION AND MANAGEMENT IN HEATING, VENTILATING, AND AIR CONDITIONING (HVAC) SYSTEMS

BACKGROUND

The present disclosure relates generally to heating, ventilating, and air conditioning (HVAC) systems, and more particularly to refrigerant leak management for HVAC systems.

Residential, light commercial, commercial, and industrial HVAC systems are used to control temperatures and air quality in residences and buildings. Generally, the HVAC systems may circulate a refrigerant through a closed refrigeration circuit between an evaporator, where the refrigerant absorbs heat, and a condenser, where the refrigerant releases heat. The refrigerant flowing within the circuit is generally formulated to undergo phase changes within the normal operating temperatures and pressures of the system so that quantities of heat can be exchanged by virtue of the latent heat of vaporization of the refrigerant. As such, the refrigerant flowing within a HVAC system travels through multiple conduits and components of the circuit. Inasmuch as refrigerant leaks compromise system performance or result in increased costs, it is accordingly desirable to provide detection and response systems and methods for the HVAC system to reliably detect and respond to any refrigerant leaks of the HVAC system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system includes a heating ventilation and air conditioning (HVAC) system and circuit components that are configured to determine a refrigerant leak is present within an HVAC system based on a signal. The circuitry components are then configured to send a first set of instructions to a first set of control systems associated with one or more fans in response to the refrigerant leak being present. Additionally, the first set of instructions is configured to cause the one or more fans to activate. The circuit components are then configured to determine that the refrigerant leak signal is no longer present based on the signal and initiate a counter to detect when a period of time has passed, in response to determining that the refrigerant leak signal is no longer present. Further, the circuit component are configured to send a second set of instructions to the first set of control systems, in response to the counter indicating that the period of time has passed. The second set of instructions is then configured to cause the one or more fans to return to base operating conditions.

In another embodiment, an integrated circuit includes a plurality of circuit components that are configured to detect that a signal corresponding to a refrigerant leak is present, and send a first set of instructions to a first control system associated with one or more fans in response to the refrigerant leak being present. The first set of instructions is configured to cause the one or more fans to activate. The circuit components are then configured to determine that the refrigerant leak signal is no longer present based on the signal and initiate a counter to detect when a period of time has passed in response to determining that the refrigerant leak signal is no longer present. Additionally, the circuit components are configured to send a second set of instructions to the first set of control systems in response to the counter indicating that the period of time has passed, and the second instructions are configured to cause the one or more fans to return to base operating conditions.

In an additional embodiment, a set of hardware components are configured to receive a refrigerant leak signal from a sensor assembly, and transmit a leak detection signal and pre-set a counter in response to receiving the refrigerant leak signal. Further, the set of hardware components are configured to determine that the refrigerant leak signal is no longer being received. The hardware components are then configured to transmit the leak detection signal after a delay period of time after the refrigerant leak signal is no longer received, and in response to the counter indicating that the delay period of time has passed.

In a further embodiment, a method includes determining that a signal corresponding to a refrigerant leak is present and sending a first set of instructions to a first set of control systems associated with one or more fans, in response to the refrigerant leak being present. Additionally, the first set of instructions is configured to cause one or more fans to activate. Further, the method includes initiating a counter to detect when a period of time has passed in response to determining that the refrigerant leak signal is no longer present, and sending a second set of instructions to the first set of control systems, in response to the counter indicating that the period of time has passed. The second set of instructions is then configured to cause the one or more fans to return to base operating conditions.

Other features and advantages of the present application will be apparent from the following, more detailed description of the embodiments, taken in conjunction with the accompanying drawings which illustrate, by way of example, the principles of the application.

BRIEF DESCRIPTION OF THE DRAWINGS

These and other features, aspects, and advantages of the embodiments described in the present disclosure will become better understood when the following detailed description is read with reference to the accompanying drawings in which like characters represent like parts throughout the drawings, wherein:

FIG. 6 is a graphical representation of various signal outputs for a refrigerant leak detection and mitigation system, in accordance with present techniques;

DETAILED DESCRIPTION

Figure 1:
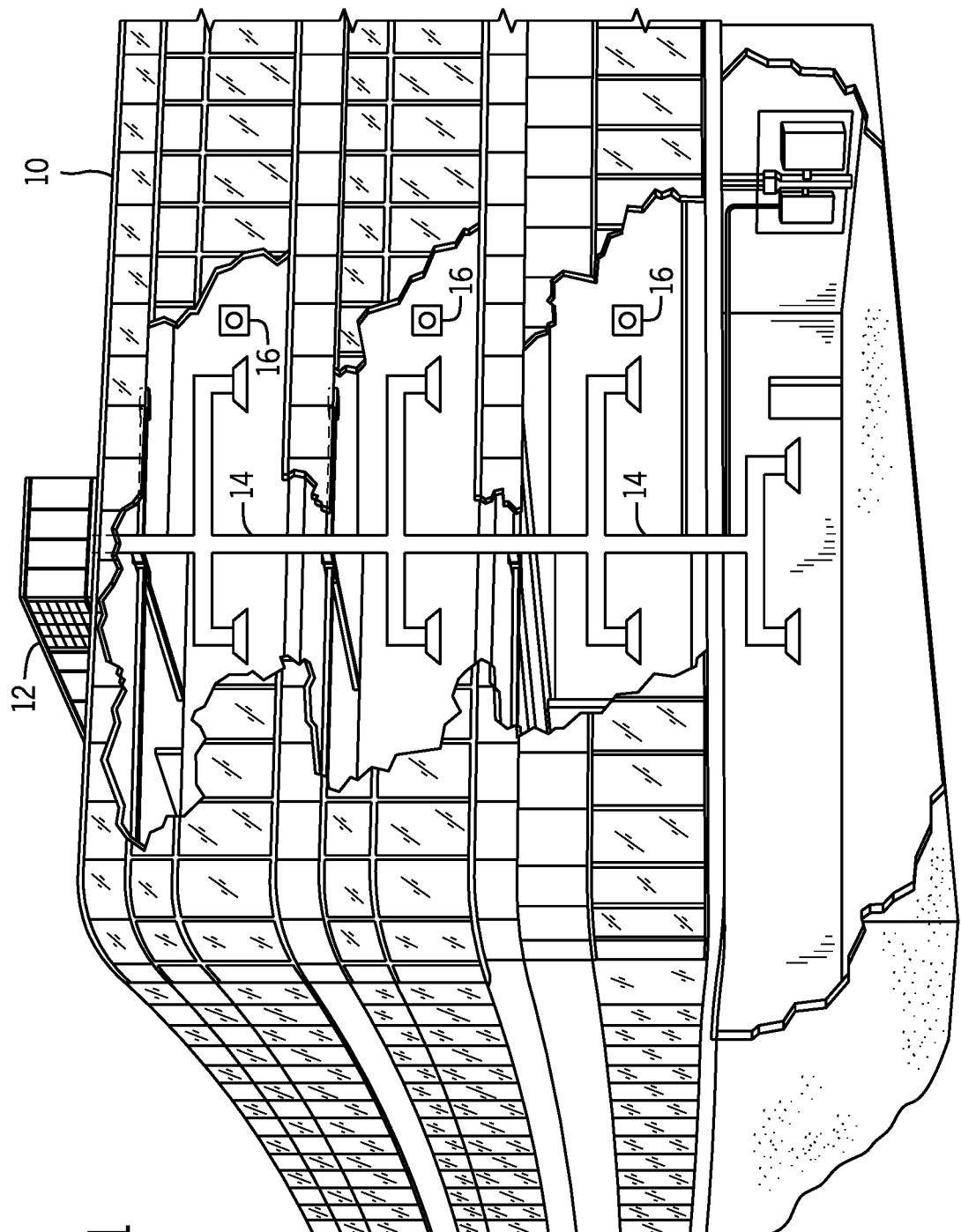
FIG. 1 is an illustration of an embodiment of a commercial or industrial HVAC system, in accordance with present techniques.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As discussed above, a HVAC system generally includes a refrigerant flowing within a refrigeration system. However, the refrigerant may inadvertently leak from a flow path of the refrigeration system due to wear or damage to components, faulty joints, or connections within the refrigeration system at some point after installation. If undetected, leaking refrigerant may compromise system performance or result in increased costs. As such, present techniques enable HVAC systems to reliably detect and manage refrigerant leaks.

With the foregoing in mind, present embodiments are directed to a refrigerant leak management system that is capable of detecting and/or mitigating refrigerant leaking from a refrigeration circuit of a HVAC system. The disclosed refrigerant leak management system includes leak mitigation hardware logic that includes an oscillator generating a clock, a resettable down counter with pre-load functionality, and a logic array that may implement override output logic conditions. The override output logic conditions may correspond to industry standards (e.g., ASHRAE 15-2019).

Sensors of the HVAC system may detect a refrigerant leak and may send a signal to the leak mitigation hardware logic to indicate that a leak has occurred. In response to receiving a refrigerant leak detection signal, the leak mitigation hardware logic may shut off compressors and electrical devices and continue operating the supply air fan for a specified duration (e.g., delay time period corresponding the regulatory standards) after the leak refrigerant detector has sensed a drop in refrigerant concentration and the refrigerant leak detection signal is no longer present. In this way, the supply fan may function to purge the leaked refrigerant from the equipment enclosure into the external environment until the leaked refrigerant concentration has dropped below a threshold concentration. The compressors and electrical devices may be shut off until the leak is no longer present to avoid operating while the refrigerant leak is present.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes a HVAC unit 12. The building 10 may be a commercial structure or a residential structure. As shown, the HVAC unit 12 is disposed on the roof of the building 10; however, the HVAC unit 12 may be located in other equipment rooms or areas adjacent to the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
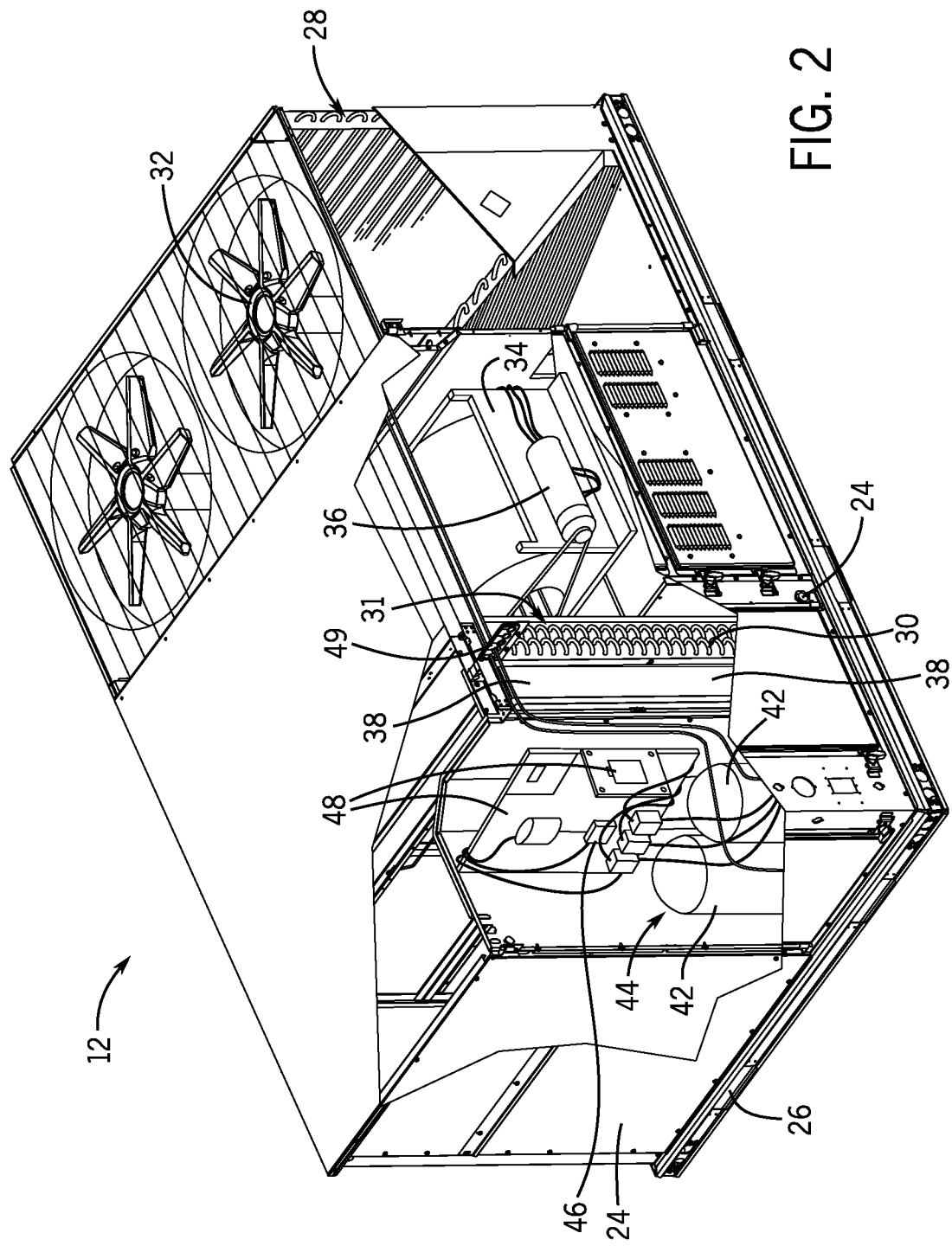
FIG. 2 is an illustration of an embodiment of a packaged unit of the HVAC system, in accordance with present techniques.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant through the heat exchangers 28 and 30. For example, the refrigerant may be A2L refrigerants or any other suitable refrigerants. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
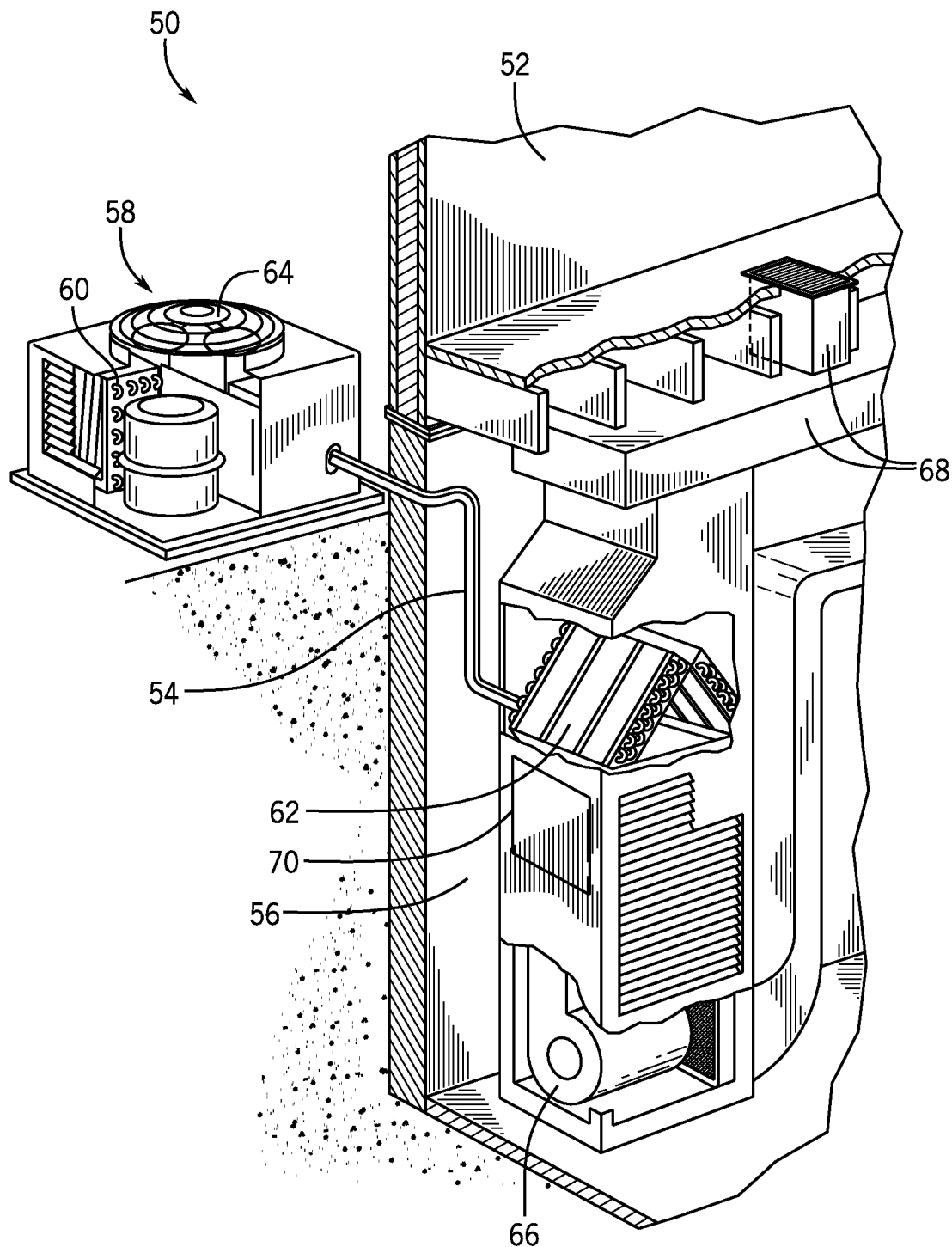
FIG. 3 is an illustration of an embodiment of a split system of the HVAC system, in accordance with present techniques.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered.

The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger that is separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
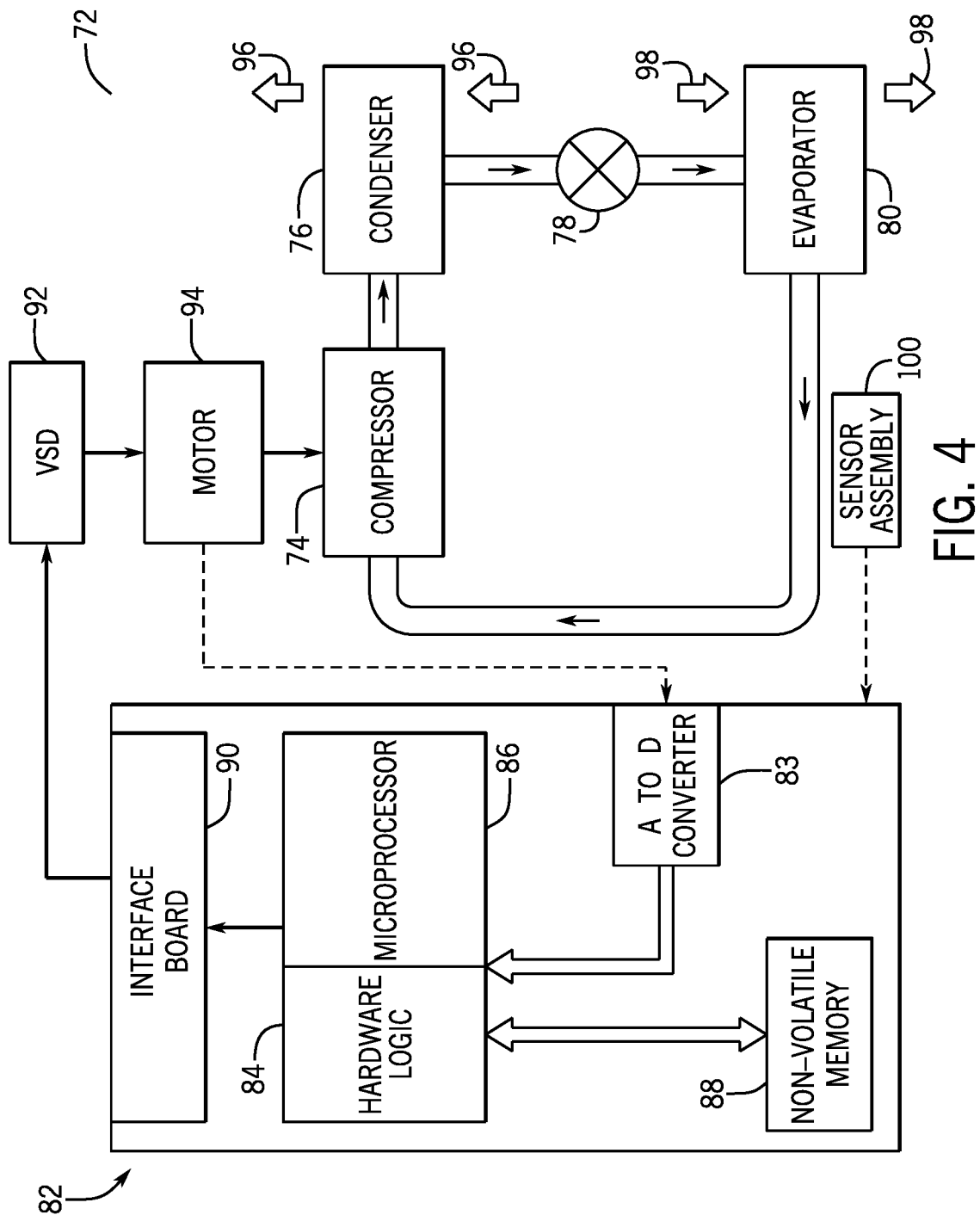
FIG. 4 is a schematic diagram of an embodiment of a refrigeration system of the HVAC system, in accordance with present techniques.

FIG. 4 is an embodiment of a vapor compression system 72 that can be used in any of the systems described above. The vapor compression system 72 may circulate a refrigerant through a set of components include a compressor 74. The set of components may also include a condenser 76, an expansion valve(s) or device(s) 78, and an evaporator 80. The vapor compression system 72 may further include a control panel 82 that may include an analog to digital (A/D) converter 83, a microprocessor 86, hardware logic 84, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may include one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator 80 relative to the supply air stream 98 and may reheat the supply air stream 98 when the supply air stream 98 is overcooled to remove humidity from the supply air stream 98 before the supply air stream 98 is directed to the building 10 or the residence 52.

The vapor compression system 72 may include one or more sensors communicatively coupled to the control panel 82 to detect refrigerant leak faults and other types of equipment faults (e.g., high-pressure refrigeration override switches, fan overload). The one or more sensors may be any type of sensors, including electrochemical gas detectors, catalytic bead sensors, photoionization detectors, infrared point sensors, infrared imaging sensors, semiconductor sensors, ultrasonic gas detectors, holographic gas sensors, pressure sensors or any other suitable sensors capable of detecting a concentration of the refrigerant and/or detecting high pressure switch trips. Moreover, the refrigerant leak management system may, additionally or alternatively, include other sensors suitable for detecting a presence of the refrigerant, such as temperature sensors, pressure sensors, acoustic sensors, flowrate sensors, etc.

In addition to the sensors described above, the control panel 82 may be coupled to a sensor assembly 100 that may include one or more refrigerant sensors, a microcontroller, and a power supply. The power supply may be coupled to the microcontroller, and the microcontroller may provide output logic (e.g., binary output 24 Voltage Analog Convertor (VAC), Sensor Actuator bus, 4-20 miliamp (mA) signals) to the control panel 82. The microcontroller may receive the one or more refrigerant sensor signals, and based on the signals, the microcontroller may determine that the refrigerant leak is present. For example, during operation of the HVAC system, a leak of the refrigerant may not be present when the concentration of the refrigerant 104 is below a lower management limit (e.g., lower flame limit per UL60335-2-30). However, when refrigerant leaks from a conduit and is detected by the one or more refrigerant sensors, the microcontroller receives the sensor data and determines that a non-zero concentration of the refrigerant is present within the sleeves around the conduits of the HVAC system. As a result, the microcontroller of the sensor assembly 100 may then send a refrigerant leak signal to hardware logic 84 of the control panel 82. The hardware logic 84 may include a discrete logic device, a complex programmable logic device (CLPD), a field-programmable gate array (FPGA), an application-specific integrated circuit (ASIC), or the like.

Additionally, the microcontroller of the sensor assembly 100 may compare the concentration of the refrigerant received from the one or more refrigerant sensors to a predefined concentration threshold. The predefined concentration threshold may be a user-set, technician-set, or distributor-set value that is stored within the control panel 82, either before or after the sensor assembly 100 is placed into operation within the HVAC system. In response to determining that the concentration of the refrigerant is greater than or equal to the predefined concentration threshold, the sensor assembly 100 may output a signal to hardware logic 84 of the controls system 82 that indicates that a refrigerant leak is present in the HVAC system. This enables the operation and/or continued operation of the fans to maintain the sub-barometric pressure and other enables other mitigation measures (e.g., turning off compressors and heaters) to be implemented. In some embodiments, rather than continuously measure the one or more refrigerant sensor data the microcontroller may also wait a predefined time threshold before determining the concentration of the refrigerant again, thus enhancing sensor life. In certain embodiments, the predefined time threshold is set as 1 minute, 5 minutes, 10 minutes, 60 minutes, or any suitable frequency.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed above, the HVAC system generally includes a refrigerant flowing within a refrigeration system. However, the refrigerant may inadvertently leak from a flow path of the refrigeration system due to wear or damage to components, faulty joints, or connections within the refrigeration circuit at some point after installation. If undetected, leaking refrigerant may compromise system performance or result in increased costs.

With this in mind, the present embodiments described herein incorporate hardware logic 84 to enable the HVAC system to detect a refrigerant leak and perform mitigation measures to reduce the concentration of refrigerant within the HVAC system and disperse the refrigerant into the outside environment via the air supply fan, and suspend compressor and other equipment operations to avoid damage to these components due to the refrigerant leaks. In this way, the present embodiments may perform the mitigation measures in lieu of employing software and/or firmware to control various operations, thereby providing a more robust and reliable system for implementing the mitigation measures.

Figure 5:
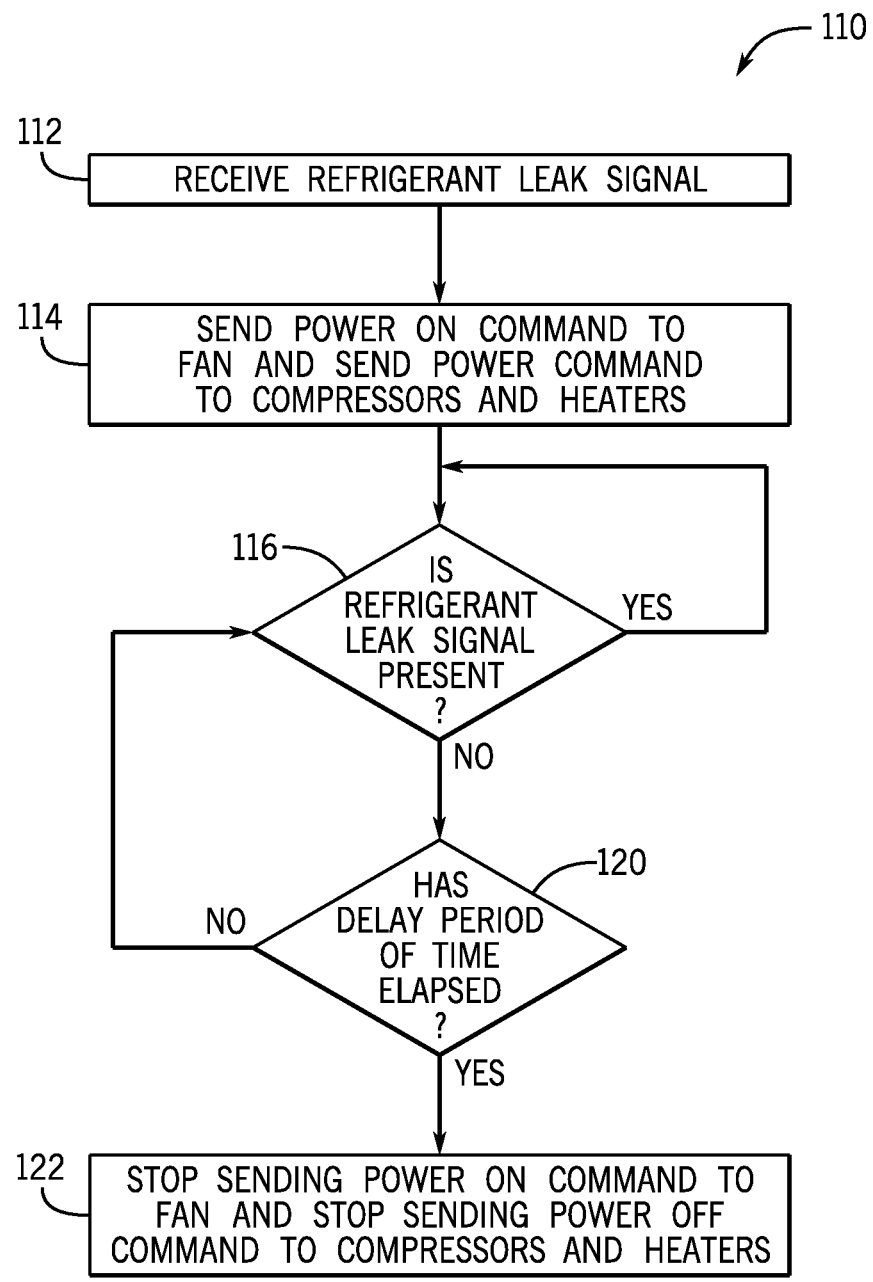
FIG. 5 is a flowchart of a method of refrigerant leak detection and mitigation for the refrigeration system of FIG. 4, in accordance with present techniques.

As discussed above, refrigerant leaks may occur in HVAC systems and certain mitigation actions relating to industry regulatory standards may be implemented to activate air supply fans and shut off compressors and electrical equipment in response to detecting refrigerant leaks. To implement these mitigation measures, the HVAC system may employ hardware logic 84 to detect refrigerant leaks and automatically shut down compressors and electrical equipment and activate an air supply fan to disperse the refrigerant according to regulatory standards. With the foregoing in mind, FIG. 5 is a method of refrigerant leak detection and mitigation for the refrigeration system of FIG. 4, in accordance with the present disclosure. As will be discussed in more detail below, the method 110 of refrigerant leak management includes hardware logic 84 of the control panel 82 that may detect a refrigerant leak signal and perform suitable control actions to mitigate the leaked refrigerant. The suitable control actions to mitigate the leaked refrigerant may be designated according to industry safety standards (e.g., ASHRAE 15-2019).

Before proceeding, it should be noted that any suitable computing device (e.g., the control panel 82) may control components of the HVAC system and perform the operations described below with reference to the method 110. In some embodiments, the method 110 may be performed by one or more hardware components, such as hardware logic 84 circuits (e.g., output lockout circuit, 16-bit down counter, and the like) that are part of the control panel 82. While the method 110 is described using steps in a specific sequence, it should be understood that the present disclosure contemplates that the described steps may be performed in different sequences than the sequence illustrated, and certain described steps may be skipped or not performed altogether.

To begin the illustrated method 110, hardware logic 84 that is part of the control panel 82 may, at process block 112, receive a refrigerant leak signal indicative of a detection of a leak of refrigerant from a sensor assembly 100. The refrigerant leak signal may be generated by the sensor assembly 100 based on sensor data received from one or more refrigerant sensors that indicate that the concentration of refrigerant exceeds a threshold value (e.g., compares sensor reading to 25% lower flame limit). The sensor assembly 100 may then send the refrigerant leak signal to the control panel 82, and the hardware logic 84 may begin to implement multiple mitigation processes to disperse leaked refrigerant outside the HVAC system and avoid damaging equipment within the HVAC system due to the refrigerant leak.

For example, at process block 114, the hardware logic 84 may send control instructions to the supply air fan 32 or a controller that controls operations of the supply air fan 32 to operate at a predetermined speed or rotational rate in response to receiving the refrigerant leak signal. Additionally, the hardware logic 84 may send instructions to the one or more compressors 74 to power down in response to the refrigerant leak signal detection. Moreover, the hardware logic 84 may send the instructions to any heaters and/or electrical devices located in the ductwork of the HVAC system to power down. It should be understood that the hardware logic 84 may send commands to any component of the HVAC system to comply with regulatory standards for performing refrigerant leak mitigation and should not be limited to the commands described herein.

At process block 116, the hardware logic 84 may determine whether the refrigerant leak is still present based on whether the refrigerant leak signal (e.g., high signal) is still being received from the sensor assembly 100. If the hardware logic 84 determines that the refrigerant leak signal is still present, the hardware logic may return to block 116. That is, the hardware logic 84 may not modify the operations of the fans, the compressors, or other equipment because the refrigerant leak is still present. As such, the supply fan may remain active and the heaters, compressors 72, and/or other electrical devices located in the ductwork of the HVAC system may be inactive.

Returning to block 116, if the hardware logic 84 determines that the refrigerant leak signal is no longer being received, the hardware logic 84 may implement a time delay countdown to wait before modifying operations of the devices accessed at block 114. If the time delay countdown has completed and a certain amount of delay period of time has expired, the hardware logic 84 may proceed to block 122 and send updated instructions to controllers to return to non-fault operations (e.g., perform normal operations based on control signals present when refrigerant leak signal is no longer received) that control the operations of the supply air fan 32, the one or more compressors 72, and other devices. That is, if the delay period of time has expired, the hardware logic 84 may proceed to block 122 and may return to non-fault operations, the normal operations may involve updated instructions being sent to the supply air fan 32 to deactivate and updated instructions to the one or more compressors 72 and other devices to activate based on control signals related to non-fault operations. The time delay countdown may be implemented via the control logic utilizing any suitable hardware control logic (e.g., 16-bit down counter with pre-load). The counter may be pre-set to a delay value corresponding to industry regulatory requirements.

For example, the delay value may be set according to ASHRAE 15-2019 fault standards, which specify the air supply fan should be activated for a minimum of five minutes after the sensor assembly 100 has sensed a drop in refrigerant concentration below a specified value. In the same manner, the ASHRAE 15-2019 fault standards may specify that the one or more compressors 72 and one or more heaters should remain deactivated for a minimum of five minutes after the refrigerant concentration is no longer below the threshold value. Although the period of time is described above with reference to the ASHRAE 15-2019 fault standards, it should be noted that the time delay may be updated to reflect any regulatory standards or suitable time period specified by an individual or user.

This method enables the HVAC system to implement mitigation actions when a refrigerant leak signal is detected that corresponds to industry standards in response to a refrigerant leak utilizing hardware logic 84 located in the control panel 82. The method mitigates the use of software programs and/or other mitigation methods to be programmed into the control panel 82. The hardware logic 84 may also enable greater reliability than software programs for mitigation of refrigerant leaks.

With the forgoing in mind, FIG. 6 is a graphical representation 130 of various signal outputs for a refrigerant leak detection and mitigation system, in accordance with present techniques. The hardware logic 84 of the HVAC system may transmit signals to one or more compressors 72, one or more heaters, and the hardware logic 84 in response to detecting a refrigerant leak signal. These signals may correspond to specific regulatory guidelines determined for refrigerant leaks in HVAC systems, such as the ASHRAE 15-2019 fault standards discussed above.

The graphical representation 130 includes time on the horizontal axis and signal strength and/or counter value on the vertical axis. The graphical representation 130 includes the refrigerant leak signal 132 over time (e.g., due to detected refrigerant leak) received at the hardware logic 84 of the control panel 82 in response to the sensor assembly 100 detecting a refrigerant leak. The graphical representation 130 also includes a leak override signal 134, which is activated (e.g., high signal value) via hardware logic 84 elements in response to detecting the presence of the refrigerant leak signal 132. The leak override signal 134 is high for the time duration that corresponds to regulatory guidelines after the refrigerant leak signal 132 is no longer detected. The compressor output signal 136 corresponds to the operation of the compressors 72, and the counter value 138 corresponds to the counter hardware logic 84 (e.g., 16-bit down-counter with preload). The counter value corresponds to the regulatory guidelines for delay time to maintain refrigerant leak mitigation actions.

Referring now to the graphical representation 130, the hardware logic 84 may receive the refrigerant leak signal 132 at time 140, indicating that a refrigerant leak has occurred in the HVAC system. In response to the refrigerant leak signal 132 being high, the hardware logic 84 may enable the leak override signal 134 to go high, which in turn activates multiple mitigation elements (e.g., commands to activate air supply fan 32 and turn off electrical components of the refrigerant system). For example, in response to the leak override signal 134 being high (e.g., signal is present), the hardware logic 84 may control multiple components of the HVAC system including one or more compressors 72, one or more heaters, and one or more supply fans 32 to perform mitigation operations (e.g., turn off and/or turn on).

For example, after receiving the high leak override signal 134, at the time 140, the hardware logic 84 may cause the compressor output signal 136 to go low, which may cause the compressor 72 to deactivate. At time 142 the refrigerant leak may no longer be present and the refrigerant leak signal 132 may no longer be received (e.g., signal value is low). The removal of the refrigerant leak signal 132 may cause the counter value to begin counting down (e.g., according to the regulation requirements for the delay period for mitigation actions to continue after refrigerant leak is no longer present) at the time 142. The compressor output signal 136 may remain low and the leak override signal 134 value may remain high while the counter value 138 is counting down. As such, the time delays may meet the ASHRAE 15-2019 fault standard that specifies that the compressor 72 is to remain off for at least five minutes after the refrigerant leak signal 132 was received by the hardware logic 84.

At time 144, the counter value 138 may have counted down to expiration. In response to the counter value reaching zero (e.g., delay time period completed), the leak override signal 134 will no longer be active (e.g., go to low/zero voltage value) and the compressor 72 will be activated via the compressor output signal 136 becoming active (e.g., high voltage) at time 144.

Further, at time 146 the refrigerant leak signal 132 may become active again (e.g., leak detected) for a short time period. In response to the refrigerant leak signal 132 becoming active, the hardware logic 84 may cause the leak override signal 134 to become active and the compressor output signal 136 to become inactive. As a result, the compressor 72 may turn off.

The counter value 138, at the time 147, will begin counting down until it expires or the refrigerant leak signal 132 returns. For instance, at time 148, the refrigerant leak signal 132 may become active again. However, since the counter value 138 did not expire, the hardware logic 84 continued to produce the leak override signal 134. At time 148, the counter value 138 may reset and remain high until the refrigerant leak signal 132 is no longer active.

At time 150, the refrigerant leak signal 132 may no longer be active. In response to the refrigerant leak signal 132 no longer being active, the counter value 138 may begin counting down for the delay time period. In additional, the leak override signal 134, which causes the compressor output signal 136 to be low, will remain active during the countdown period.

The refrigerant leak signal 132 enables the counter value 138 to be set and the counter value 138 will begin counting down when the refrigerant leak signal 132 is no longer active (e.g., no refrigerant leak is detected). The leak override signal 134 will remain active until the counter value 138 has reached zero and will enable the compressor output signal 136 to be low for the duration the leak override signal is high 134 via the hardware logic 84. This enables the time delay to be implemented utilizing the refrigerant leak signal 132.

The signals discussed above may be transmitted and received via the hardware logic 84 that may be part of the control board 82. This enables mitigation efforts to be met via use of the hardware logic 84 elements without the need for software control programs.

Figure 7A:
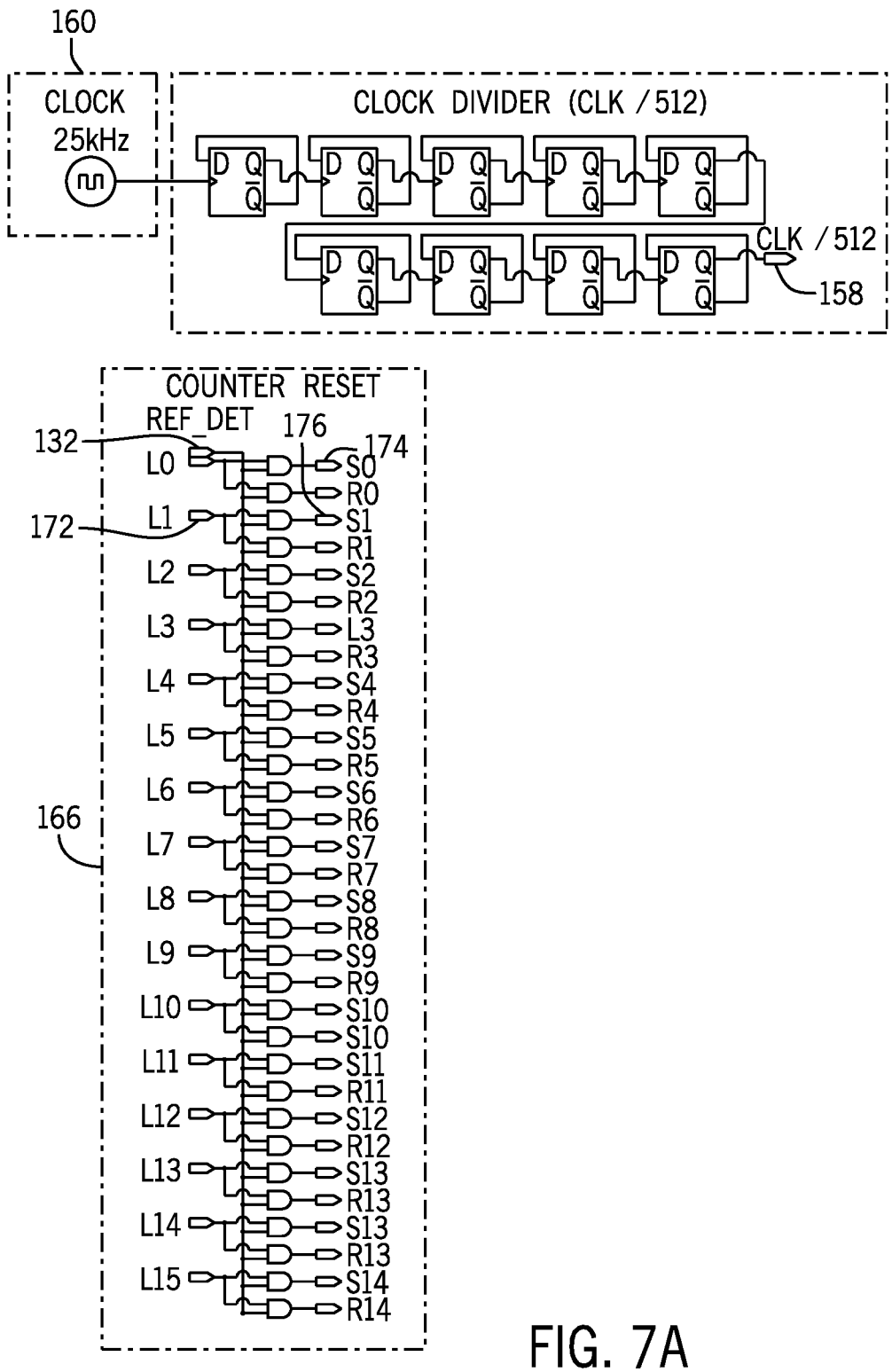
FIG. 7A is an example schematic diagram of components of control logic including a counter pre-set and clock component for the refrigerant leak detection and mitigation system of FIG. 6, in accordance with present techniques.

With the foregoing in mind, FIG. 7A is an example schematic diagram of components of control logic including a counter pre-set and clock component for a refrigerant leak detection and mitigation system, in accordance with present techniques. The leak mitigation hardware control logic 130 may function to turn off compressors and heaters and activate an air supply fan for a specified delay period according to industry standards (e.g., ASHRAE 15-2019) in response to a leak detection signal (e.g., refrigerant leak signal 132) being received from a refrigerant sensor detector.

The leak mitigation hardware control logic 130 may perform mitigation measures when a reference detection signal (e.g., REF_DET 132), indicating a refrigerant leak, is received at the counter pre-set logic 166. The counter pre-set logic 166 may include inputs [L15:L0] 172. The refrigerant leak signal 134 enables the loading of the counter pre-set values [L15:L0] 172, which establishes the override latch time (e.g., value calculated based on the clock frequency). The refrigerant leak signal 132 is loaded into the [L15:L0] 172 inputs via the circuitry connection. The [L15:L0] 172 inputs generate the [S15: S0] 174 and [R15:R0] 176 outputs via each of the [L15:L0] inputs being sent into multiple AND logic gates with the reference detection signal 132 to generate the [S15:S0] (e.g. set value) 174 and [R15:R0] 176 outputs. The hardware control logic 130 also includes a counter signal 158 generated by the oscillator clock and clock divider logic circuitry 160. The five minute standard according to the ASHRAE-2019 regulatory guidelines may be specified, but more clock dividers may be added to account for additional time frames.

Figure 7B:
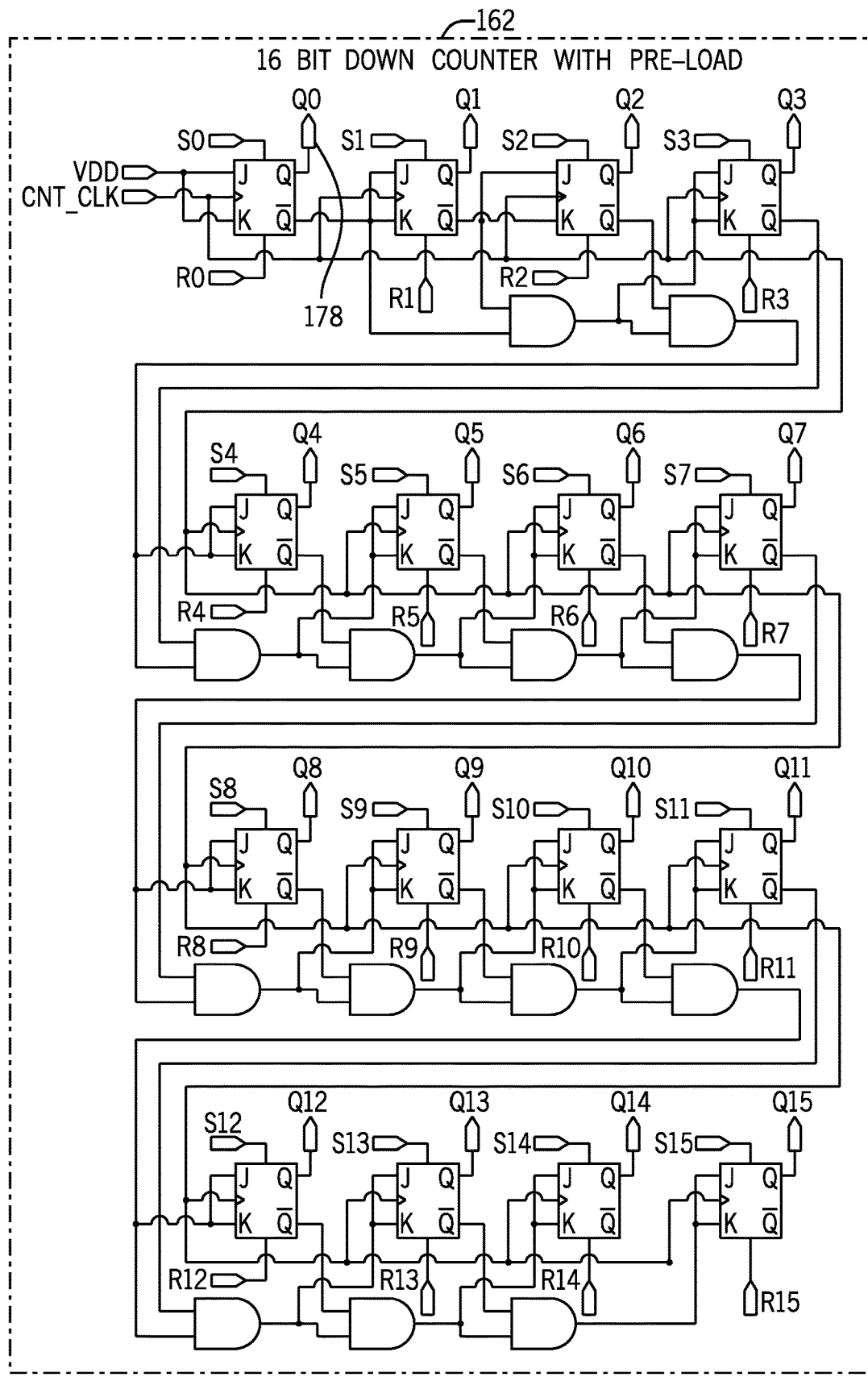
FIG. 7B is an example schematic diagram of components of control logic including a counter component for the refrigerant leak detection and mitigation system of FIG. 6, in accordance with present techniques.

With the foregoing in mind, FIG. 7B is an example schematic diagram of components of control logic including a counter component for a refrigerant leak detection and mitigation system, in accordance with present techniques. As detailed above, the counter pre-set 166 circuitry utilizes the refrigerant leak signal 132 and the [L15:L0] 172 signals to generate the [S15: S0] 174 and [R15:R0] 176 signals that are able to pre-set the 16-bit down counter with pre-load 162 through the asynchronous inputs of the SR-type flip-flops utilized to implement the down counter. The 16 bit down counter with pre-load 162 includes 16 connected J-K flip flops that include the [S15: S0] 174 and [R15:R0] 176 signal inputs. The [S15:S0] 174 and [R15:R0] 176 signal inputs set the J-K flips flops. When the J-K flip flops inputs have an active signal they will not begin counting down regardless of [Q15:Q0] 178 signal outputs. This enables the counter to not begin counting down until the [S15:S0] 174 and [R15:R0] 176 signal inputs are no longer active regardless of the clock [Q15:Q0] 178 signal outputs.

Figure 7C:
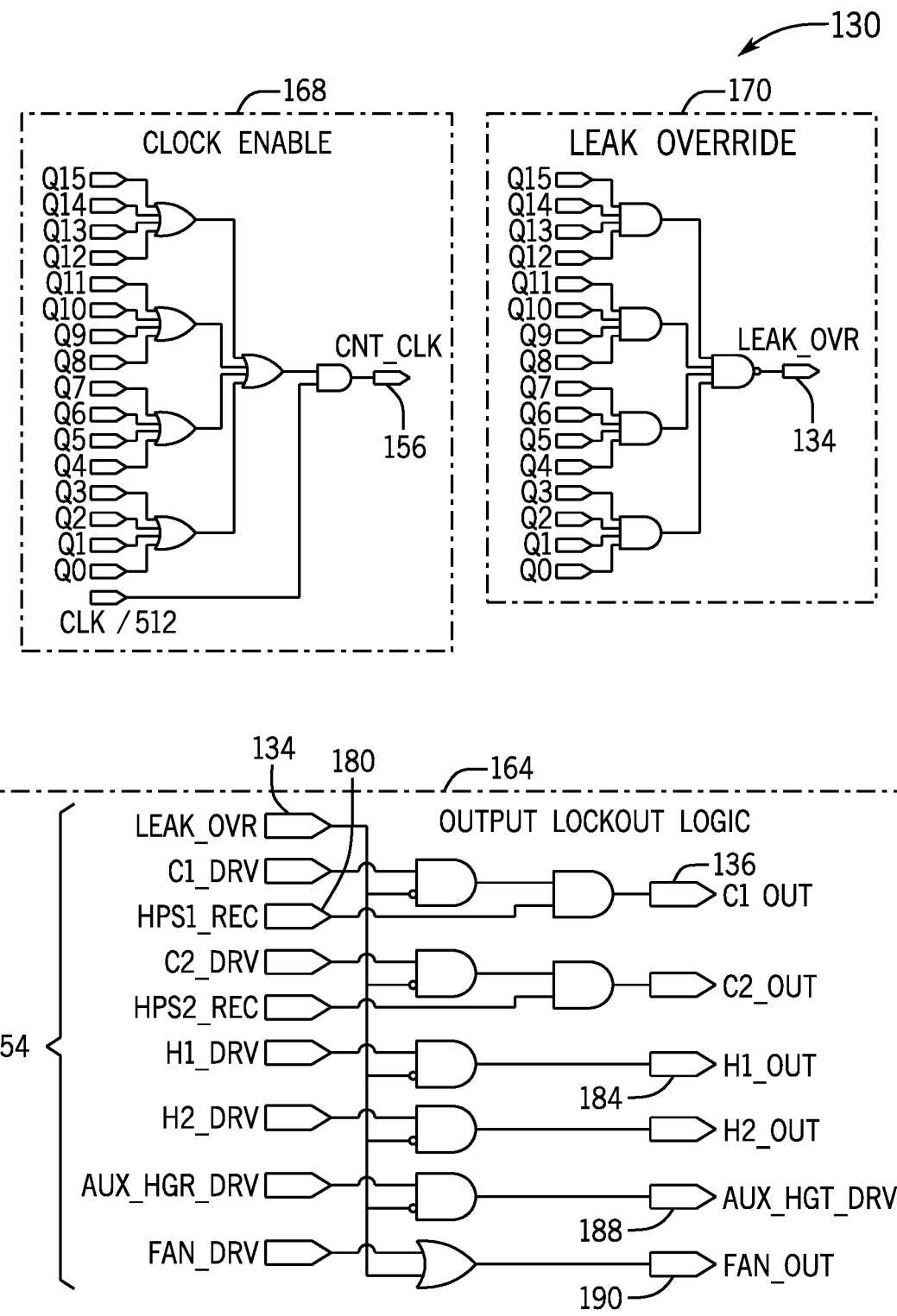
FIG. 7C is an example schematic diagram of components of control logic including output lockout logic components for the refrigerant leak detection and mitigation system of FIG. 6, in accordance with present techniques.

Based on the above, FIG. 7C is an example schematic diagram of components of control logic including output lockout logic components for a refrigerant leak detection and mitigation system, in accordance with present techniques. The [Q15:Q0] 178 signal outputs of the 16-bit down counter with pre-load 162 are sent into the clock enable 168 and leak override logic circuitry 170. With a non-zero [Q15:Q0] 178 output value, the counter clock input is enabled by the clock logic circuitry 168. In other embodiments, the counter may include an up-counting device or re-triggerable monostable multi-vibrator circuit instead of a down counter that may use a resister and capacitor to set the timing instead of the bits counter. The counter enables 168 the logic circuitry output signal of the counter 158 to be sent into the input of the 16-bit down counter with pre-load 162 and the leak over signal 134 output signal of the leak override logic circuitry 170 to be active. The clock enable logic circuitry 168 includes the [Q15:Q0] 178 input into four OR logic gates with input corresponding to [Q15:Q12], [Q11:Q8], [Q7:Q4], and [Q3:Q0]. The outputs of the four OR logic gates are coupled to a single OR logic gate. The output of the single OR logic gate is coupled to a final AND logic gate that activates the counter clock 156 signal. The other input of the final AND logic date is the counter signal 158 generated by the oscillator clock and clock divider logic circuitry 160. The five minute standard according to the ASHRAE-2019 regulatory guidelines may be specified, but more clock dividers may be added to account for additional time frames. It should be understood that although the J-K flip flops are utilized any type of flip flop that provides asynchronous inputs may be implemented.

The [Q15:Q0] 178 output values are also sent to the leak override logic circuitry 170 which include multiple AND gates and a final NAND gate output coupled to the leak override signal 134 output that enables the leak override signal 134 to remain active until the [Q15:Q0] 178 output values are de-incremented to zero. The value of [Q15:Q0] 178 will not begin de-incrementing until the counter reaches zero, which causes the counter clock 158 signal to be disabled and the leak over signal 134 to return to zero.

The leak override signal 134 is sent to an input of the output logic circuitry 164. The output logic circuitry directs the leak override signal 134 to the input of the AND logic gates also coupled to the compressor output signals 136 (e.g., C1_OUT, C2_OUT), heater output signals 184 (H1_OUT, H2_OUT), the electronic load regenerative heating output signal 188 (e.g., AUX_HGT_DRV), and a supply air fan output signal 190 (e.g., supply air fan). The input for the compressor output signals 180 AND gate is the leak override signal 176 and the compressor input signal 154 which are input to an AND gate and connected to an additional AND gate along with the input of the high-pressure switch input signal. The same logic circuitry is applied to the heater output signal 184 and the electronic load regenerative heating output signal 188. For example, the compressor may be on and the compressor activation signal may be high. The active leak override signal 134 is inverted by the logic gate and the result is a low output sent to the final AND logic gate for the compressor output signal 186 resulting in the compressor signal going low and the compressor 72 being powered off during the duration of the leak override signal being high 134.

The fan activation signal input 154 is input to an OR logic gate along with the leak override 134 signal. This enables the fan output signal 190 (e.g., fan output) to remain high when a refrigerant leak is detected through the time period specified by the clock logic 160. The output lockout logic 164 may include other override controls that correspond to high-pressure switches for the compressor. The one or more high-pressure switch signals 180 are input at the AND gate coupled to the compressor signal output 136 and may result in the compressor 72 turning off if a high-pressure switch trip is detected. Although one configuration of output lockout logic 164 is detailed above, multiple configurations may be implemented to implement the mitigation standards.

Figure 8:
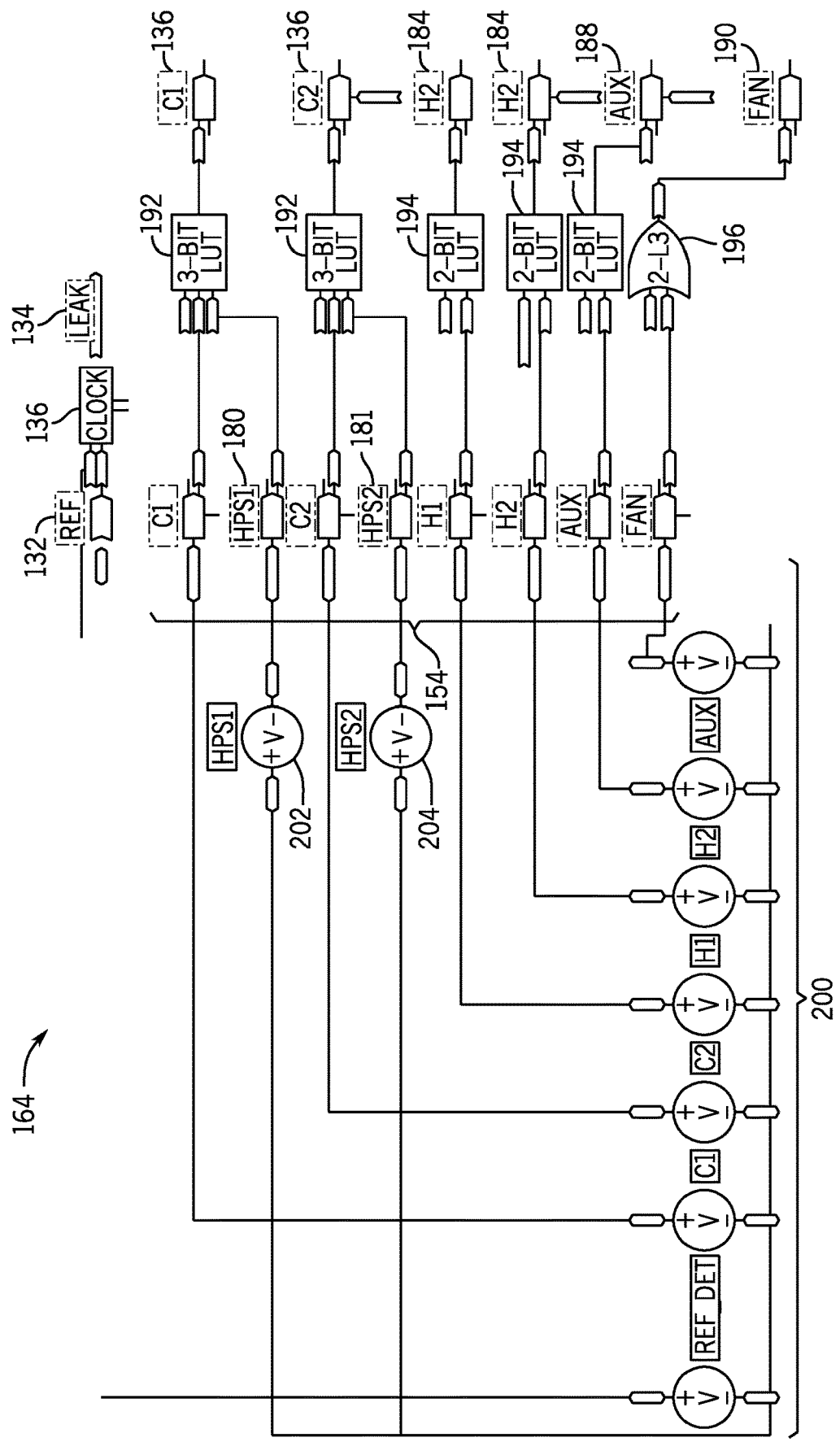
FIG. 8 is an example schematic diagram of the output lockout logic of the control logic of FIGS. 7A-7C, in accordance with the present techniques.

Based on the foregoing, FIG. 8 is an example schematic diagram of the output lockout logic of the control logic of FIG. 7, in accordance with the present techniques. The high leak override signal 134 may enable all the compressors 72 and heaters to be turned off during the time period that the reference detection signal 132 signal is received and the delay period after the reference detection signal 132 is no longer received at the control logic 130.

The refrigerant leak signal 132 may be coupled to the clock enable 168 and the 16-bit down counter with pre-load 162 circuitry as mentioned above in FIG. 8. The leak override signal 134 signal may be activated in response to the reference detection signal 132 signal being received and may be coupled to the inputs of the compressor output logic 136 and the heater output logic 184 respectively through two 3-bit Look-up-Table 192 for each of the compressor output logic 136 and three 2-bit LUT 194 for each of the heater output logic 184. The two 3-bit LUTs 192 may receive inputs from each of the compressor drive signals 154 respectively which receive inputs from the input control signals 200, the leak override signal 134, and the high-pressure switch signals 180 respectively. The three 2-bit LUTs 194 may each receive the input of the heater drive signals 154 or the electronic load regenerative heating drive signal and may receive the leak override signal 134 input.

The 3-bit LUTs 192 are coupled to the input for the high-pressure switch signals 180, 181 that may detect if a pressure switch override trip signal 202, 204 has occurred and results in the compressor 72 corresponding to the override to be powered off according to regulatory standards. The 3-bit LUTs 192 and 2-bit LUTs 182 may be set to correspond to the hardware logic 84 discussed above in the logic output array 164 of FIG. 8. The 3-bit LUTs 192 may include the hardware logic 84 that utilizes logic gates to allow a high compressor signal output when the leak override signal 176 signal is low and the high-pressure signal switch 180 is high. The two-bit LUTs may be include the hardware logic 84 that enables high output signals when the drive signals 154 are high and the received leak override signal at the input is low. This enables multiple compressor and heaters to be turn off in response to a refrigerant leak being detected to comply with regulatory standards.

The input logic corresponding to the supply fan output signal 190 is a 2-L3 OR logic gate that enables the supply fan to be active when a signal is received at the logic gate by either the fan drive activation signal 154 and/or the leak override signal 134. This enables the supply fan to be active 196 according to leak mitigation regulatory standards.

The output circuitry may be implemented in the architecture described above, or any other suitable architecture to implement the lockout method. The input signals 154 for all the compressors 72 and heaters, may be coupled to the logic circuit as discussed above. The controlling elements are the leak override signal 134 signal which may remain on for the delay time period after the refrigerant leak signal 132 is no longer received.

Although the foregoing description of the example schematic diagrams for control logic is described as being used to implement the techniques described herein, it should be noted that these schematic diagrams are provided for exemplary purposes. That is, the hardware logic 84 to implement the above-referenced techniques may include other arrangements, logic elements, and the like. Moreover, it should be noted that, in some embodiments.

While only certain features and embodiments of the present disclosure have been illustrated and described, many modifications and changes may occur to those skilled in the art, such as variations in sizes, dimensions, structures, shapes and proportions of the various elements, values of parameters, mounting arrangements, use of materials, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the embodiments, all features of an actual implementation may not have been described, such as those unrelated to the presently contemplated best mode of carrying out the disclosure, or those unrelated to enabling the claimed features. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:
1. A system, comprising:
   a heating, ventilation, and air conditioning (HVAC) system; and
   a plurality of circuit components comprising one or more processors and memory storing instructions executable by the one or more processors to cause the one or more processors to:
      determine that a refrigerant leak is present within the HVAC system based on a signal received from one or more refrigerant leak sensors;
      send a first set of instructions to a first set of control systems associated with one or more fans in response to determining the refrigerant leak to be present, wherein the first set of instructions is configured to cause the first set of control systems to activate the one or more fans;
      determine that the refrigerant leak is no longer present based on a change in the signal received from the refrigerant leak sensor;

initiate a counter to detect when a period of time has passed in response to determining that the refrigerant leak is no longer present; and send a second set of instructions to the first set of control systems in response to the counter indicating that the period of time has passed, wherein the second set of instructions is configured to cause the first set of control systems to return the one or more fans to base operating conditions.

2. The system of claim 1, wherein the instructions are executable by the one or more processors to cause the one or more processors to send a third set of instructions to a second set of control systems associated with one or more components within the HVAC system in response to determining the refrigerant leak to be present, wherein the third set of instructions is configured to cause the second set of control systems to deactivate the one or more components.

3. The system of claim 2, wherein the one or more components comprise one or more heaters, one or more compressors, or any combination thereof.

4. The system of claim 2, wherein the instructions are executable by the one or more processors to cause the one or more processors to send a fourth set of instructions to the second set of control systems in response to the counter indicating that the period of time has passed, wherein the fourth set of instructions is configured to cause the second set of control systems to return the one or more components to base operating conditions.

5. The system of claim 1, wherein the instructions are executable by the one or more processors to cause the one or more processors to:
produce a leak override signal in response to determining the refrigerant leak is present;
remove the leak override signal after the counter indicates that the period of time has passed; and
send the second set of instructions in response to the leak override signal being removed.

6. The system of claim 1, wherein the plurality of circuit components comprise a discrete logic device, a complex programmable logic device (CLPD), a field-programmable gate array (FPGA), an application-specific integrated circuit (ASIC), or any combination thereof.

7. The system of claim 1, wherein the counter comprises a 16-bit down counter with pre-load functionality.

8. The system of claim 7, wherein the plurality of circuit components comprise an oscillator clock component.

9. The system of claim 8, wherein the instructions are executable by the one or more processors to cause the one or more processors to send an output of the oscillator clock component to the 16-bit down counter in response to receiving the signal.

* * * * *